(12) United States Patent
Zelon

(10) Patent No.: US 7,232,165 B2
(45) Date of Patent: Jun. 19, 2007

(54) PET WASTE COLLECTION AND DISPOSAL DEVICE

(75) Inventor: David Zelon, 443 12th St., Santa Monica, CA (US) 90402

(73) Assignee: David Zelon, Santa Monica, CA (US)

( * ) Notice: Subject to any disclaimer, the term of this patent is extended or adjusted under 35 U.S.C. 154(b) by 0 days.

(21) Appl. No.: 11/060,689

(22) Filed: Feb. 16, 2005

(65) Prior Publication Data
US 2006/0181091 A1  Aug. 17, 2006

(51) Int. Cl.
    A01K 29/00  (2006.01)
(52) U.S. Cl. ..................................... 294/1.5
(58) Field of Classification Search .......... 294/1.3–1.5, 294/55; 15/257.1; 383/9, 12, 13
    See application file for complete search history.

(56) References Cited

U.S. PATENT DOCUMENTS

| 2,348,964 | A | * | 5/1944 | Dodson ..................... 383/20 |
| 3,819,220 | A | * | 6/1974 | Bredt ........................ 294/1.5 |
| 3,819,922 | A | | 6/1974 | Bredt |
| 4,121,866 | A | | 10/1978 | Schall |
| 4,136,900 | A | * | 1/1979 | Thompson ................. 294/1.5 |
| 4,156,400 | A | | 5/1979 | Migdal |
| 4,210,351 | A | | 7/1980 | Orofino |
| 4,335,678 | A | * | 6/1982 | Garza et al. ................ 294/1.5 |
| 4,466,647 | A | | 8/1984 | Spevak |
| 4,717,186 | A | * | 1/1988 | Yoshioka ................... 294/1.5 |
| 4,878,703 | A | * | 11/1989 | Yoshioka ................... 294/1.5 |
| 5,203,598 | A | * | 4/1993 | Lindlbauer ................. 294/1.4 |
| 5,290,080 | A | * | 3/1994 | Yoshioka ................... 294/1.5 |
| 5,301,806 | A | * | 4/1994 | Olson ........................ 206/278 |

(Continued)

OTHER PUBLICATIONS

PCT, International Search Report, PCT/US06/05283 and Written Opinionof the ISA/US, date of mailing May 24, 2006.

*Primary Examiner*—Gene Crawford
*Assistant Examiner*—Esther Onyinyechi Okezie
(74) *Attorney, Agent, or Firm*—Bosco, Ward + Cicconi; Drew Cicconi, Esq.

(57) ABSTRACT

A portable pet waste collection and disposal device. The portable device comprises a nested wand, where the nested wand has an actuator, a lower end and an upper end. The nested wand has a normal tendency to fully extend itself upon activation by the actuator during deployment of the portable device. The portable device also comprises a prong unit, where the prong unit has a pair of prongs, a first hinge and a second hinge. The first hinge has a normal tendency to spread the prongs, with the second hinge normally tending to rotate the prong unit away from the lower end of the nested wand. The first hinge and second hinge controllably rotate in substantially perpendicular relation to each other. The portable device further comprises a slider coupled to the prong unit, with the slider controllably causing the second hinge to rotate back toward the lower end when the slider is released by the actuator on the nested wand at a first end. The slider has a retainer bracket at a second end for retaining the spreading of the pair of prongs during deployment of the portable device. The portable device further has a disposable bag with a folded rim around the bag's opening, where the folded rim is adapted to receive the prongs. The disposable bag has a drawstring around its opening for controllably tightening the opening upon collection of the pet waste.

12 Claims, 8 Drawing Sheets

U.S. PATENT DOCUMENTS

| | | | |
|---|---|---|---|
| 5,344,200 A * | 9/1994 | Yoshioka | 294/1.5 |
| 5,403,050 A | 4/1995 | Searing | |
| 5,676,411 A * | 10/1997 | Kwok | 294/1.5 |
| 6,039,370 A | 3/2000 | Dooley | |
| 6,386,605 B1 | 5/2002 | Kaplan | |
| 6,386,606 B1 * | 5/2002 | Marshall | 294/1.5 |
| 6,485,073 B2 | 11/2002 | Harrison | |
| 6,554,335 B1 | 4/2003 | Kelly | |
| 6,648,387 B2 | 11/2003 | Kaplan | |
| 2002/0140240 A1 * | 10/2002 | Charette | 294/1.5 |

\* cited by examiner

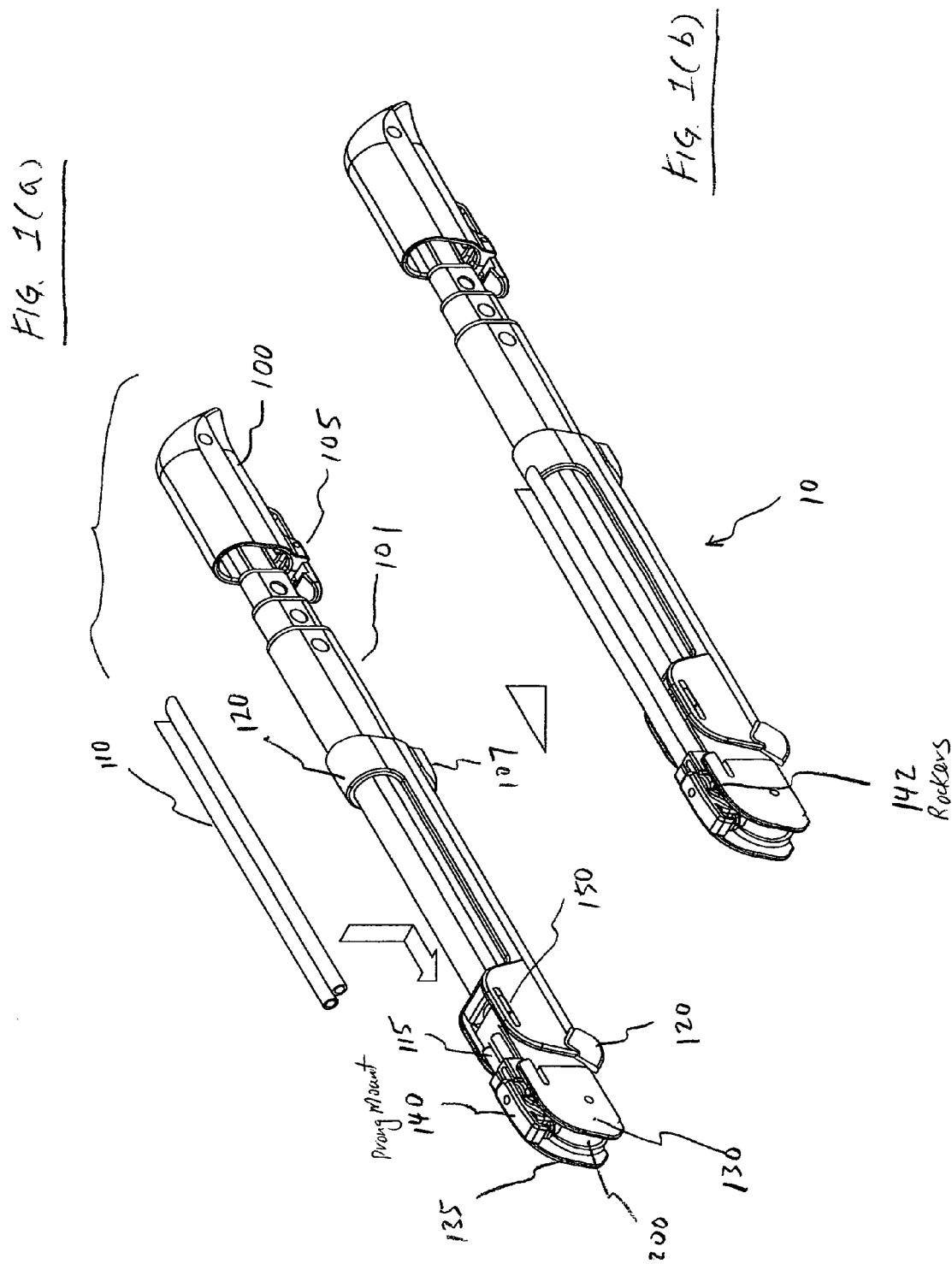

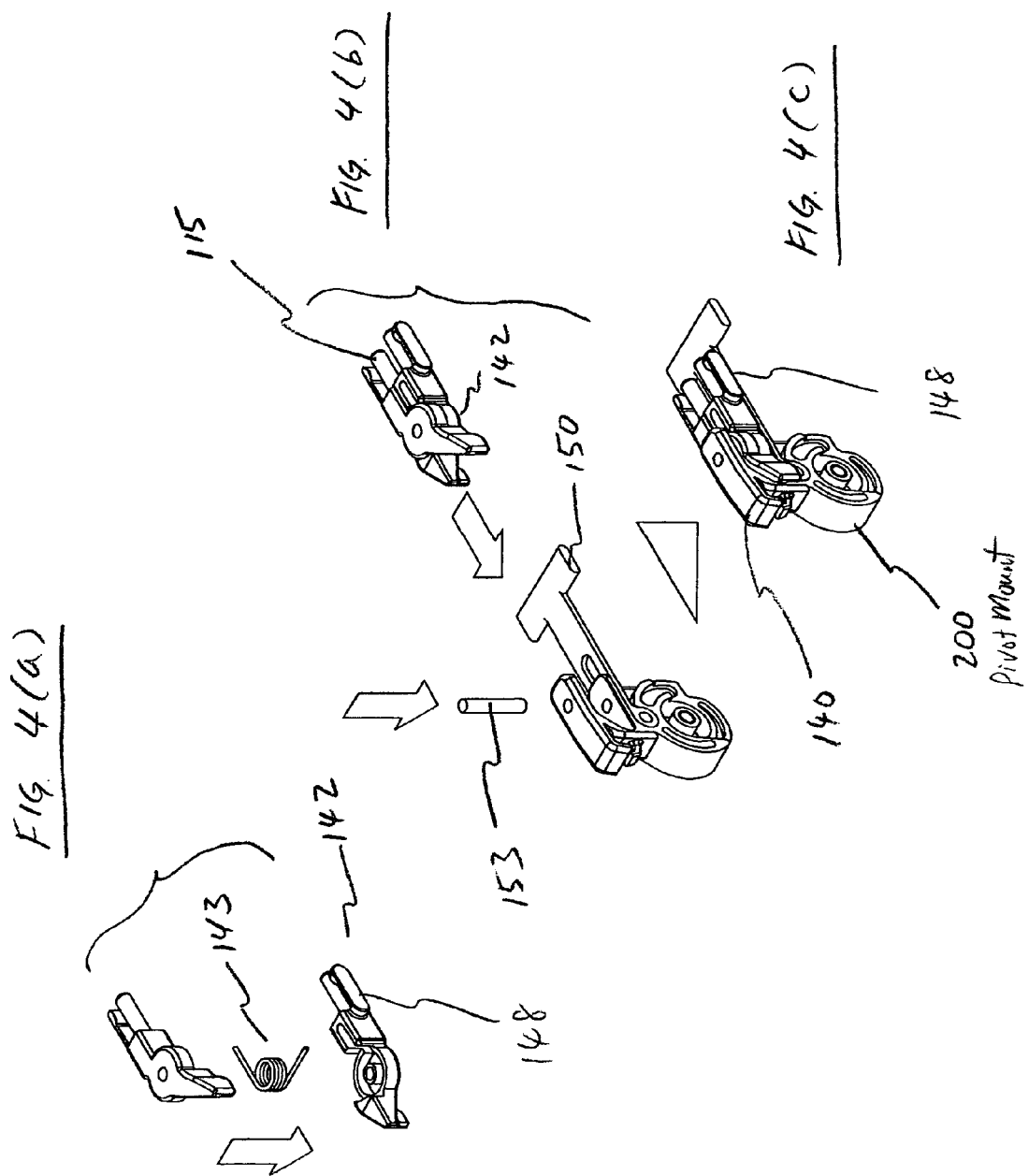

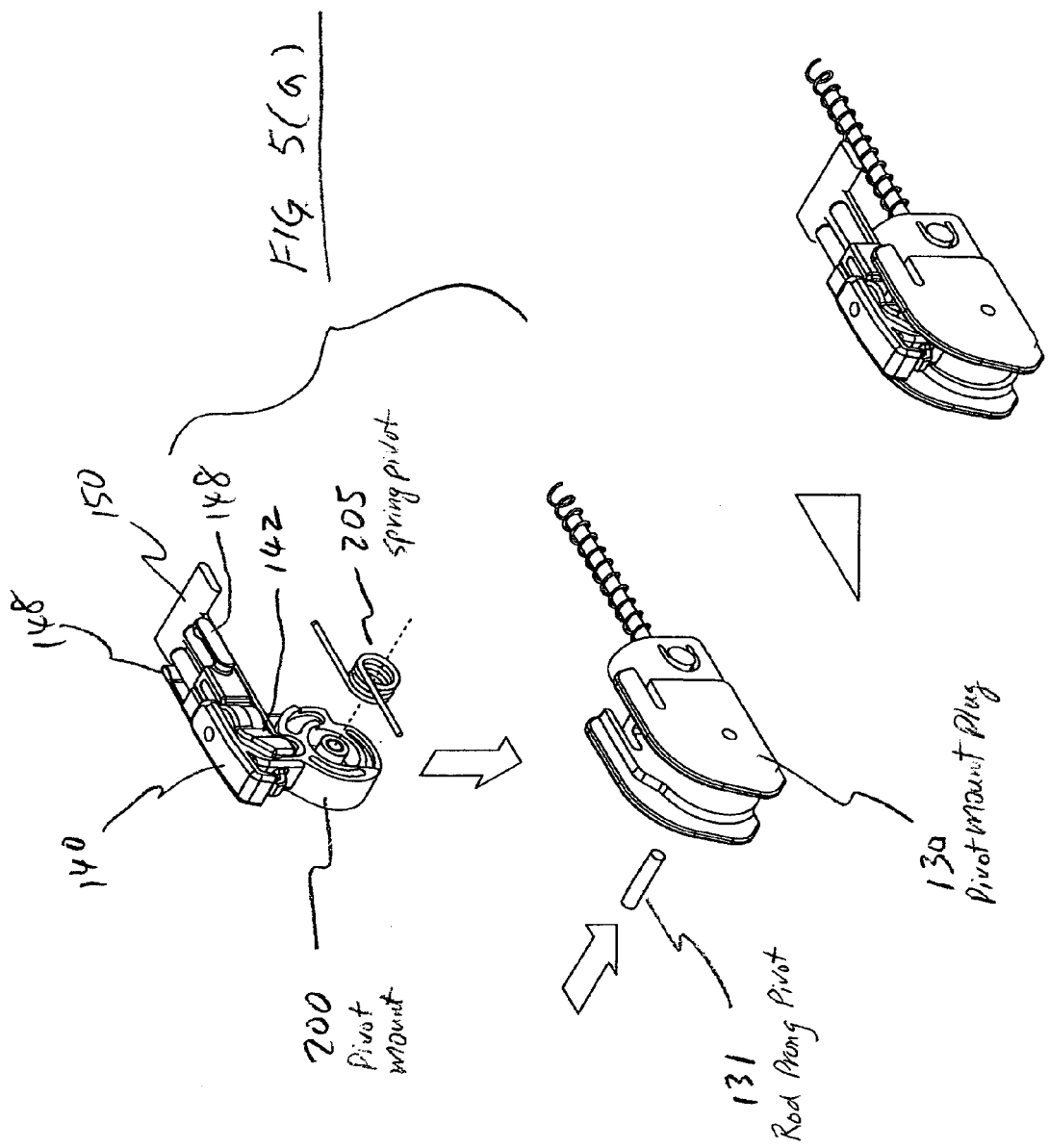

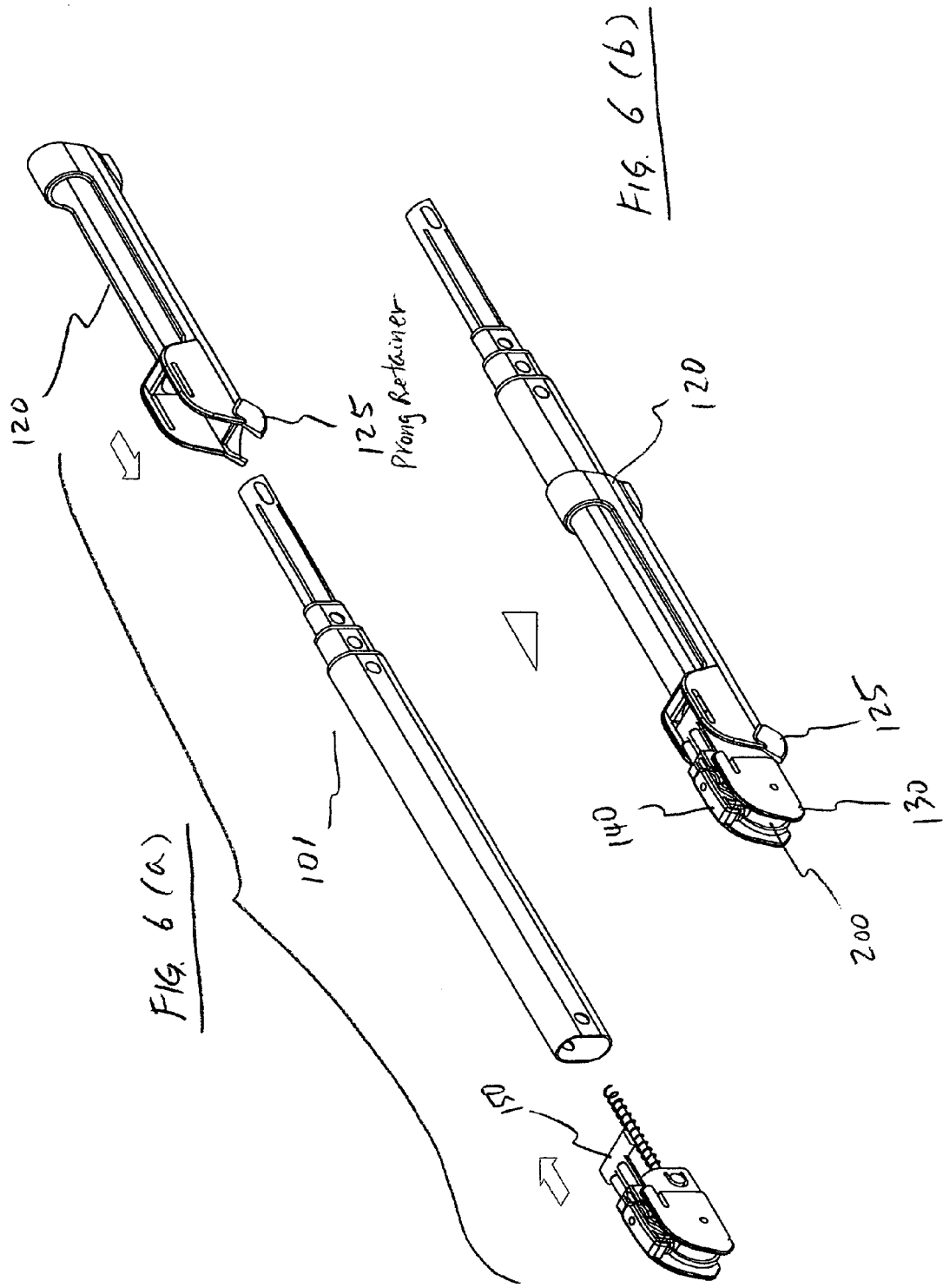

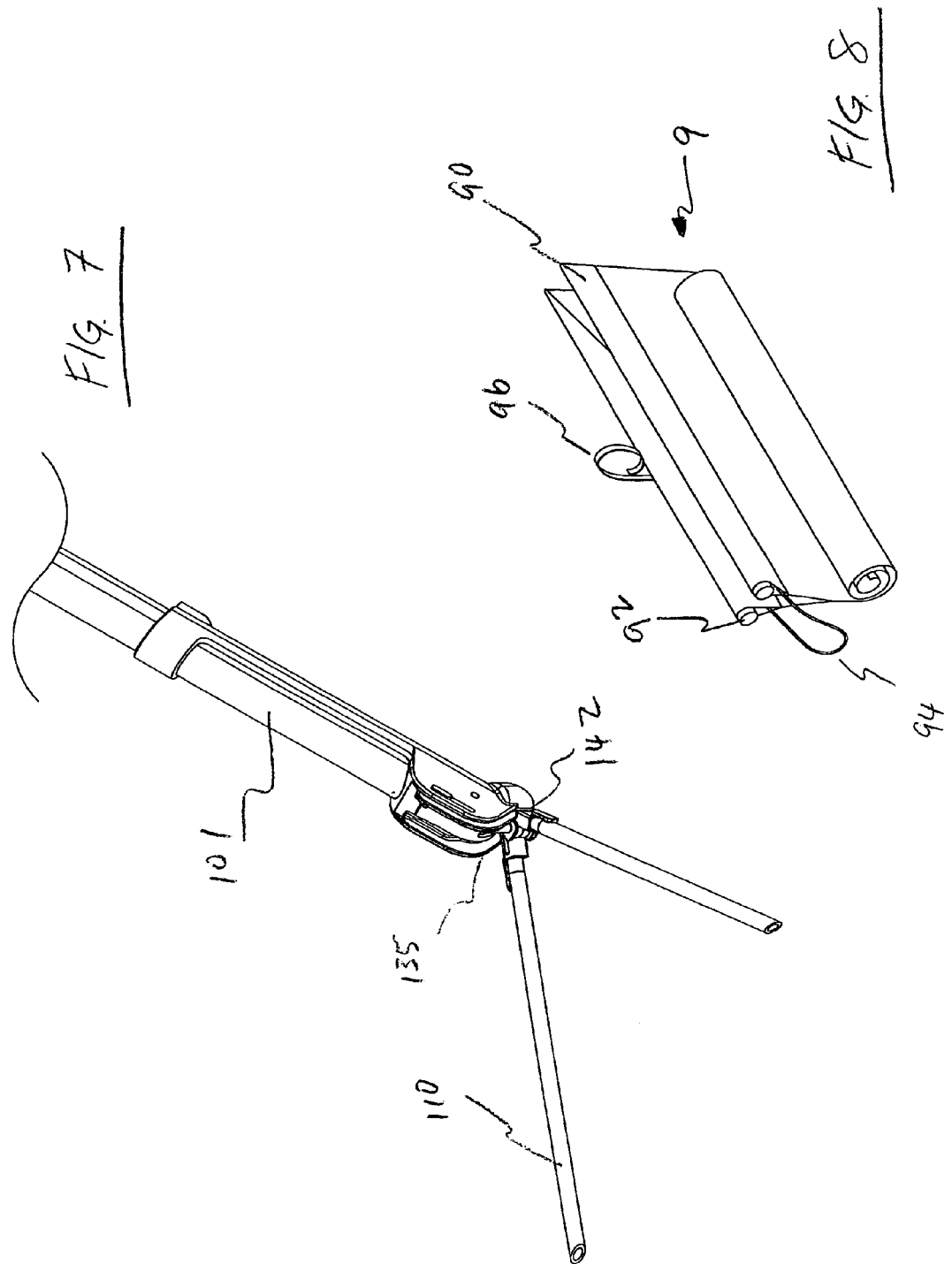

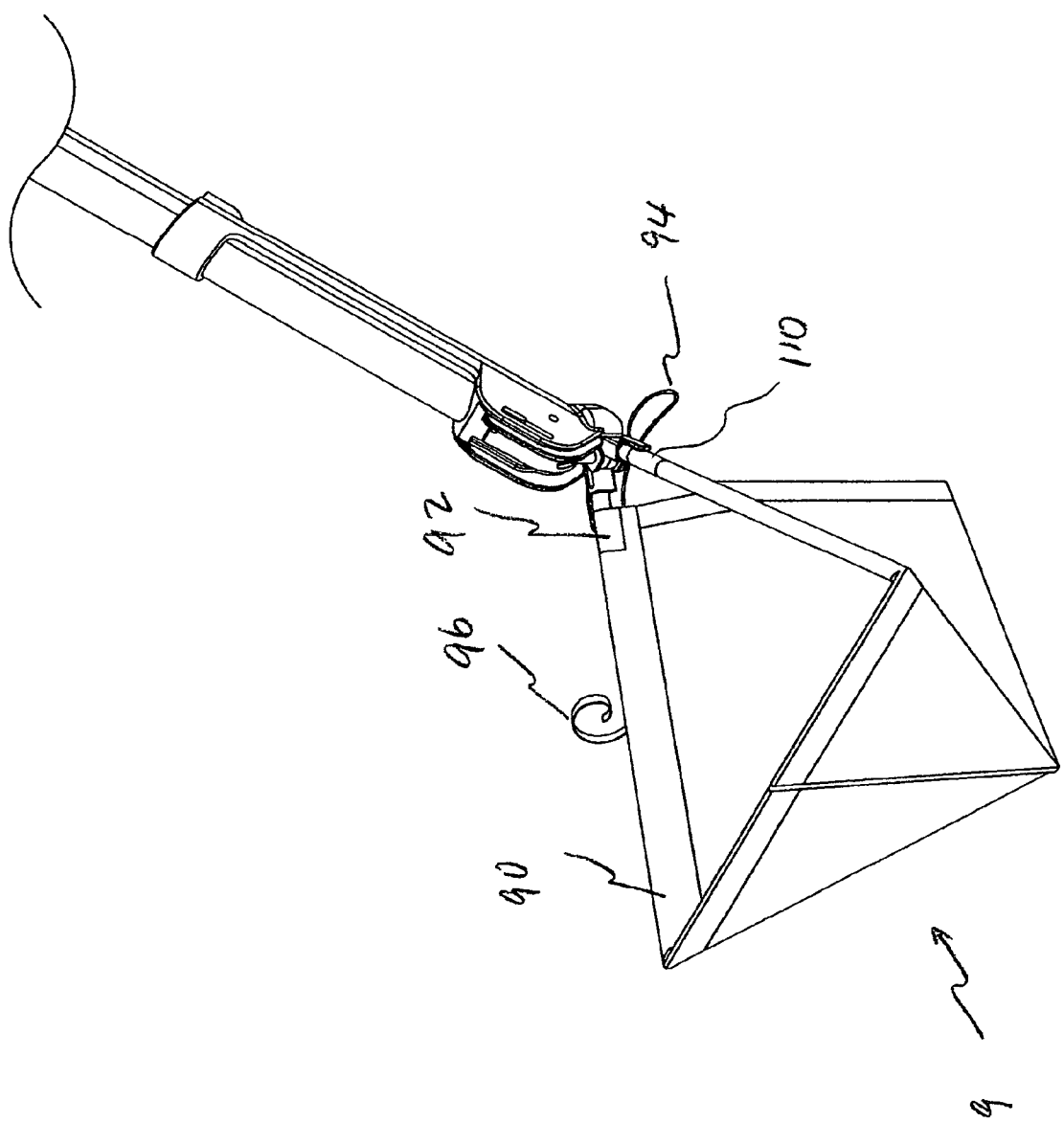

PET WASTE COLLECTION AND DISPOSAL DEVICE

FIELD OF THE INVENTION

The present invention relates to pet sanitation equipment and more particularly to an apparatus for the collection and disposal of pet waste.

BACKGROUND OF THE INVENTION

With the increasing number of urban and suburban households with pets, particularly dogs, local governments have enacted ordinances requiring pet owners to clean up after their pets in order to reduce pedestrian hazards and increase sanitation conditions in the public streets and outdoor facilities. The waste or debris left by domestic animals is unsightly, and more importantly often presents a health hazard.

Various devices have been designed to assist pet owners in cleaning up their pets feces. However, such tools are for the most part unsanitary and only marginally effective. These tools include a variety of scoops for shoveling, bags for catching and tongs for grasping pet wastes. They tend to be bulky and require daily washing after use. For example, some tools require both hands from the pet owner, in multiple steps, to maneuver, complicating the whole routine of collection and disposal. Other tools risk exposing the owner's hand to the pet waste, presenting another sanitary hazard for the pet owner. As such, the conventional devices have not been widely embraced by the pet-owning public. Some of the conventional devices have been disclosed in the following U.S. Patents:

U.S. Pat. No. 6,648,387 issued to Kaplan on Nov. 18, 2003;
U.S. Pat. No. 6,554,335 issued to Kelly et al. on Apr. 29, 2003;
U.S. Pat. No. 6,485,073 issued to Harrison on Nov. 26, 2002;
U.S. Pat. No. 6,386,606 issued to Marshall on May 14, 2002;
U.S. Pat. No. 6,386,605 issued to Kaplan on May 14, 2002;
U.S. Pat. No. 6,039,370 issued to Dooley, Jr. et al. on Mar. 21, 2000;
U.S. Pat. No. 5,403,050 issued to Searing et al. on Apr. 4, 1995;
U.S. Pat. No. 4,466,647 issued to Spevak on Aug. 21, 1984;
U.S. Pat. No. 4,210,351 issued to Orofino on Jul. 1, 1980;
U.S. Pat. No. 4,156,400 issued Migdal on May 29, 1979;
U.S. Pat. No. 4,121,866 issued to Schall et al. on Oct. 24, 1978.

Therefore, it is desirable to have a pet waste collection and disposal device that is portable and easy to operate with one hand.

It is also desirable to have a pet waste collection and disposal device that minimizes the user's exposure to the pet waste during the collection and disposal process.

SUMMARY OF THE INVENTION

The present invention is directed to a portable pet waste collection and disposal device. The device can be easily deployed to capture animal waste as it falls from the anus of a squatting pet. Once collected in the disposable bag, the device allows the disposable bag to be easily removed without exposing the user's hands to the waste within. Another disposable bag can easily be installed onto the device and the device is now ready for the next catch.

A portable pet waste collection and disposal device is disclosed. In one embodiment, the portable device comprises a nested wand, where the nested wand has an actuator, a lower end and an upper end. The nested wand has a normal tendency to fully extend itself upon activation by the actuator during deployment of the portable device. The portable device also comprises a prong unit, where the prong unit has a pair of prongs, a first hinge and a second hinge. The first hinge has a normal tendency to spread the prongs, with the second hinge normally tending to rotate the prong unit away from the lower end of the nested wand. The first hinge and second hinge controllably rotate in substantially perpendicular relation to each other. The portable device further comprises a slider coupled to the prong unit, with the slider controllably causing the second hinge to rotate back toward the lower end when the slider is released by the actuator on the nested wand at a first end. The slider has a retainer bracket at a second end for retaining the spreading of the pair of prongs during deployment of the portable device.

In another embodiment, the portable pet waste collection and disposable device comprises a disposable bag for collecting the pet waste. The disposable bag has a folded rim around its opening for receiving the prongs. The folded rim has a ring spacer at its entry point to help receiving the prongs. The disposable bag also has a drawstring around its opening to controllably tighten its opening upon collection.

BRIEF DESCRIPTION OF THE DRAWINGS

FIG. 1 illustrates the exemplary portable device 10 in accordance with the present invention.

FIG. 4 illustrates the exemplary rockers 142, spring prong pivot 143, pivot mount 200, clip 148 and pull strap 150.

FIG. 5 illustrates the exemplary rockers 142, spring pivot 205, pull strap 150, the prong mount 140, pivot amount 200, clip 148 and pivot mount plug 130.

FIG. 6 illustrates the exemplary slider 120, nested wand 101, pull strap 150, prong mount 140, pivot amount 200, prong retainer 125 and pivot mount plug 130.

FIG. 7 illustrates the exemplary prongs 110 in deployment as the rockers 142 spread outward after sliding down the rails 135.

FIG. 8 illustrates the exemplary disposable bag 9 with the folded sleeve 90, ring spacer 92, draw string 94 and retaining strap 96 in a rolled-up position.

FIG. 9 illustrates the exemplary bag in deployment as its opening is spread out by the prongs 110.

DETAILED DESCRIPTION OF THE PREFERRED EMBODIMENTS

Figures 2A, 2B:
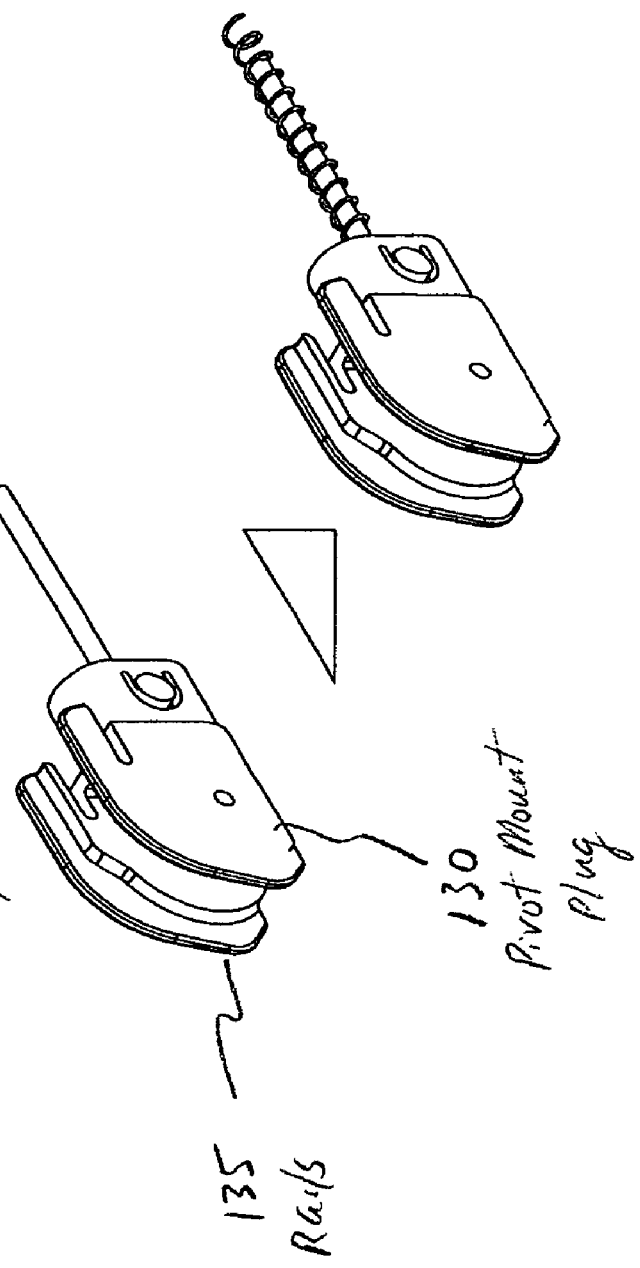
FIG. 2 illustrates the exemplary pivot mount plug 130 and the rails 135.

A portable pet waste collection and disposal device is described in this application. In the following description, numerous specific details are set forth to provide a full understanding of the present invention. It will be obvious, however, to one ordinarily skilled in the art that the present invention may be practiced without some of these specific details described herein. In other instances, well-known structures have not been shown in detail so as to avoid unnecessarily obscuring the present invention.

A description of the present invention is made with a general reference to FIGS. 1–6. Referring first to FIGS. 1, 4 and 5, an exemplary portable pet waste collection and disposal device 10 in accordance with the present invention is illustrated. The exemplary portable device 10 includes a handle 100, a nested or telescopic wand 101 and a pair of prong stems 110 attached to a pair of rockers 142 on a prong mount 140. The rockers 142 is biased by a torsion spring 143, which otherwise has a normal tendency to spread out the rockers 142. The prong mount 140 is attached to the pivot mount 200, which normally tends to pivot away from the lower end of the wand 101 due to the torsion spring 205 within. The prong mount 140 pivots in a plane perpendicular to the rotation of the pivot mount 200. As such, when the pivot mount 200 rotates the prong mount 140 away from its biased position, due to natural tendency of the torsion spring 205, the prong amount 140 also pivots to spread out the rockers 142.

The pivot amount 200 is attached to the pivot mount plug 130 through a rod prong pivot, or hinge rod, 131. The pivot mount plug 130 has a pair of opposing rims, which act to provide a pair of rails 135 to guide the rockers movement, by restricting the spreading of the rockers 142 until the rockers 142 clear out of the rails 135. At such point, the rockers 142 can spread out, thus opening the prong stems 110 for deploying a disposable bag (FIG. 8).

FIG. 2 shows the pivot mount plug 130 in more detail, before the prong mount 140 is put in place. The compression spring 133 serves to extend the last segment of the nested wand 101, as illustrated in FIG. 6. The rails 135, or rims, on opposite side of the pivot mount plug 130 control, or guide, the movement and spreading of the rockers 142 between opening and closing of the prong stems 110.

Figures 3A, 3B:
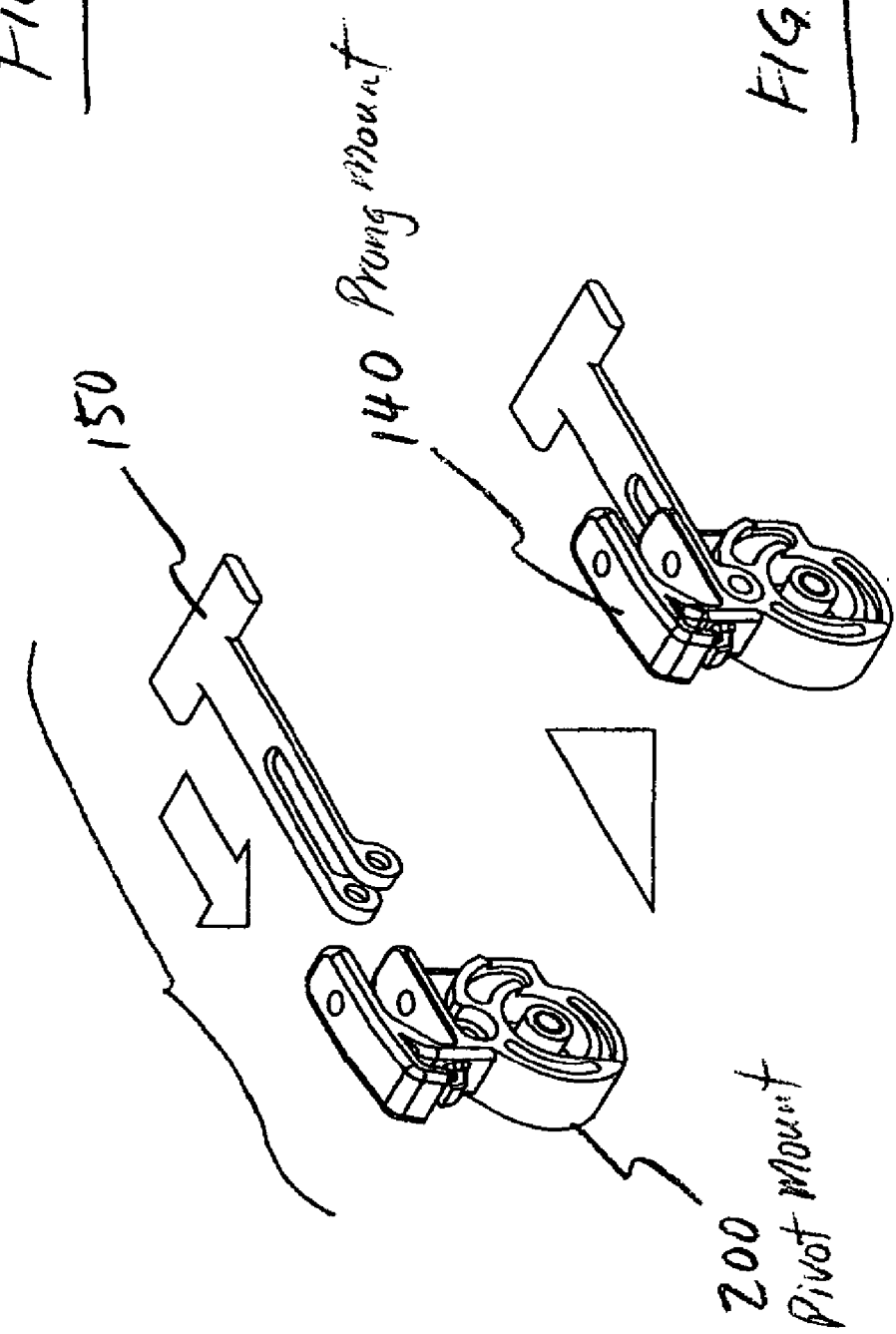
FIG. 3 illustrates the exemplary prong mount 140, pull strap 150 and pivot mount 200.

Referring now to FIGS. 1, 3 and 6, a slider 120 is connected to the prong mount 140 through a flexible pull strap 150. The slider 120 can be locked or engaged to the handle 100 by an actuator 105. The lower end of the slider 120 has a prong retainer 125 which prevents the rockers 142 from overspreading upon deployment. The prong retainer 125 is preferably a bracket-shaped opening at the lower end of the slider 120. Upon sliding down to meet the spreading rockers 142, the prong retainer 125 on the slider 120 acts to contain the further spreading of the rockers 142.

Referring to FIGS. 1 and 6, the wand 101 preferably has multiple segments, each including a compression spring loaded therein. With the compression springs, the nested wand 101 has a natural tendency to extend to its full length, when it is released by the actuator 105. It should be noted that the nested wand is only a preferred embodiment. In an alternate embodiment, the wand may be just a single elongated wand, without any adjustable length, provided that the prongs 110 are still deployable by an actuator 105. The nest wand 101, however, provides a more portable device, which can easily fit into the user's pocket, clipped to the user's belt, or hung from the user's wrist through a strap.

Referring now to FIGS. 4 and 5, the pivot mount 200 has a natural tendency to pivot, or rotate, away from the wand 101, due to the spring pivot 205. As shown in FIG. 5(a), after the spring pivot 205 is in place, the entire sub-assembly of the pivot mount 200 with the prong mount 140 can be inserted into the pivot mount plug 130, and hingedly secured by a rod prong pivot, or hinge rod, 131. As the pivot amount 200 rotates about the rod prong pivot 131 upon deployment, it pulls the slider 120, through the pull strap 150, down toward the bottom end of the wand 101. As the slider 120 is pulled, it meets the prong mount 140 and the rockers 142 as the rockers 142 spread out. The spreading-out is contained or restricted by the prong retainer 125 at the lower end of the slider 120.

Referring still to FIGS. 4 and 5, the rockers 142 are hingedly attached to the prong mount 140 through a rod prong 153. Each of the rockers 142 has a receptacle base 115 at one end for receiving and securing a prong stem 110 (FIG. 1). Preferably, the base 115 also has a flexible tab 148 for releasably securing a disposable bag (to be described in connection with FIGS. 8 and 9). The rockers 142 are biased by a spring prong pivot 143 at the arms of the rockers 142. The spring prong pivot 143 is preferably a torsion spring which has a natural tendency to spread the rockers apart.

When the prong mount 140 is retracted by the user's pulling of the slider 120 toward the handle 100, the rockers 142 are forced into a closed position. During retraction, the rockers 142 move from riding on top of the rails 135 to being restricted between the rails 135 of the pivot mount plug 130. During deployment, the rockers 135, due to the unbiased pivoting motion of the pivot mount 200, move from being restricted within the rails 135 to riding on top of the rails 135, with the prongs gradually spreading apart. At this time, the prong retainer 125 on the slider 120 is pulled by the pull strap 150 into position to meet the rockers 142. As can be understood, the angle of the prong stems 110 with respect to the nested wand 101, as well as the angle between the spread-out prong stems 110, can be set based on when the rockers 142 move out of the rails 135 and when the prong retainer 125 of the slider catches rockers 142. FIG. 7 illustrates the wand 101 with deployed prong stems 110.

When the portable device 10 is fully retracted, as shown in FIG. 1(b), the rockers 142 are restricted and closed so that the prong stems 110 are held in a parallel position. Such parallel position facilitates the placement of a disposable bag 9, as shown in FIG. 8. The disposable bag 9 may be formed to have at least two rim, or sides, surrounding its opening, with each rim to be supported by a prong stem. After the bag is placed onto the prong stems, the portable device 10 can be readily deployed when the pet is about to defecate. The disposable bag is preferably secured to the prong stems by a flexible tab 148 (FIGS. 4 and 5), which keeps the disposable bag on the prong stems during deployment of the prongs, but allows the bag to be easily removed after collection.

Operation of the Portable Pet Waste Collection and Disposal Device

When not in use, the portable collection device 10 is stowed in a state as shown in FIG. 1(b). To deploy the portable device 10, the user first slips a disposable bag 9 to the prongs 110. The user presses on the actuator 105 to first release the nested wand 101. Also, the pivot mount 200 begins rotating the prong mount 140 and rockers 142 away (outward) from the wand, due to the unbiased spring pivot 205. The pivoting also pulls the slider 120 away from the handle 100, by virtue of the flexible pull strap 150 being also pulled by the pivot mount 200. As the pivot mount 200 rotates outward, the rockers 142 and the prong mount 140 begin to move out of the rails 135 of the pivot mount plug 130. When the rockers 142 are out of the rails, the rockers 142 begin to spread apart, the angle of which is eventually retained by the prong retainer 125 of the slider 120.

After the pet waste lands in the disposable bag 9, the prongs stems 110 can be slightly narrowed by pulling the slider 120 back toward the handle 100, thus making it easy to remove the disposable bag 9 from the prongs stems 110. With the disposable bag 9 removed from the prong stems 110, the slider 120 can be further pulled back, thus bringing the prong mount 140 back (rotating inward) and closing the rockers 142. The slider 120 can then be locked to the actuator 105.

The Disposable Bag

Reference is now turned to FIGS. 8 and 9, which illustrate an exemplary disposable bag 9 in accordance with the present invention. As shown, the bag has two folded rims 90, or sleeves, around its opening, for receiving the prong stems 110. To make it easier for the prong stems 110 to be inserted, a ring spacer 92 is positioned near each opening to the folded rim 90. A drawstring 94 is also extended through the folded rim 90, and around opening of the bag, to allow the user to close the opening of the disposable bag 9, after the pet's waste is collected in the disposable bag 9. The dimension of the bag 9 is such that each side of the opening of the bag is preferably of about the same length as the prong stem 110. Preferably, there are three sides forming the opening of the bag, with two of the three sides having a ring spacer 92 near the opening of the folded rim 90.

Also, prior to being placed onto the prong stems, the disposable bag 9 is preferably rolled up and retained by a flexible open-ended retainer 96, such as a tape or a rolled-up strip of paper, to keep the bag in such rolled-up condition. After the bag 9 is applied to the parallel prong stems 110 of the portable device 10, the bag 9 can be easily opened when the prong stems 110 are spread apart. The retainer 96 preferably provides a very gentle hold on the shape of the rolled-up bag 9, without preventing or inhibiting the bag from being opened when the prongs 110 are spread out. Additionally, when the disposable bag 9 is rolled up, the ring spacers 92 are preferably positioned to be side-by-side, such that the user can easily insert the prong stems through the ring spacers 92.

The overall shape of the bag 9 is preferably constructed to have a narrowing bottom, thus ensuring the pet waste to drop to the lower point in the bag 9. As such, the distance from the opening of the bag to the bottom is maximized to prevent any risk of human exposure. Additionally, the bag may contain chemical treatment agents inside so as to interact with and absorb the pet waste upon collection.

As can be appreciated, the portable device 10 of the present invention advantageously uses the natural tendency of various spring-loaded components to achieve a simple, one-touch, operation. In a preferred embodiment, the normal tendency of the spring-loaded, nested wand 101 is to extend to its fullest length when unlocked from the actuator 105. The normal tendency of the pivot mount's torsion spring 205 is to rotate the pivot mount 200 away from the wand 101, thus moving the prong mount 140 into position for deployment. Further, the torsion spring 143 within the rockers 142 has a natural tendency to spread the rockers 142 apart, until the rockers 142 are restricted by retaining bracket 125 on the slider 120. By combining these components with the slider 120, pull strap 150 and pivot mount plug 130, a simple, smooth one-button deployment of the disposable bag can be realized.

Although the invention is described herein with reference to the preferred embodiment, one skilled in the art will readily appreciate that other applications may be substituted for those set forth herein without departing from the scope of the present invention. Accordingly, the invention should only be limited by the claims included below.

I claim:

1. A portable pet waste collection and disposal device, comprising:

a nested wand, having an actuator, a lower end and a upper end, said wand normally tending to fully extend upon activation by said actuator during deployment of said device;

a prong unit hingedly coupled to said lower end of said nested wand, having a pair of prongs, a first hinge and a second hinge coupled to said first hinge, said first hinge normally tending to spread said prongs from a juxtaposed position external to said nest wand, said second hinge normally tending to rotate said prong unit about the lower end of said nested wand, said first hinge and second hinge controllably rotating in substantially perpendicular relation to each other;

a slider coupled to said prong unit, said slider controllably causing said second hinge to rotate about said lower end when said slider is released by said actuator on said nested wand at a first end, said slider having a retainer bracket at a second end for retaining the spreading of said pair prongs during deployment of said device.

2. A portable pet waste collection and disposal device of claim 1, wherein said slider is coupled to said prong unit though a flexible pull strap, and said first hinge comprises a torsion spring and a single rotational shaft, and said second hinge comprises a torsion spring and a single rotational shaft.

3. A portable pet waste collection and disposal device of claim 1, further comprising:

a flexible clip attached to said prong unit for releasably attaching a disposable bag directly to said prongs;

a disposable bag, having a folded rim around its opening, said rim having at least two entry point for receiving said prongs in their juxtaposed and parallel position, and a drawstring extending through said folder rim, for controllably closing said opening.

4. A portable pet waste collection and disposal device of claim 1, wherein said disposable bag having a ring spacer unit with a middle aperture, said ring spacer unit being inserted at each entry point of said folded rim for receiving each of said pair of prongs through its aperture, said ring spacer unit being adapted to prop said entry point open without obstruction.

5. A portable pet waste collection and disposal device, comprising:

a wand, having an upper end and a lower end;

an actuator slideably coupled to said wand, having a lock at one end for locking to said upper end of said wand, said actuator having a retainer bracket at another end of said actuator;

a base coupled to the lower end of said wand, said base having protruding rails on its two sides;

a pivot mount hingedly connected to the base, and coupled to said actuator, the pivot mount having a normal tendency to rotate about the lower end of the wand using a torsion spring, defining a first axis of rotation, upon actuation by said actuator; and, a prong mount hingedly coupled to said pivot mount, said prong mount having two rockers hingedly coupled to said prong mount, each of said two rockers having a prong base for holding a pair of prong stems, the rockers having a torsion spring to cause said rockers to controllably spread apart defining a second axis of rotation substantially normal to said first axis, said rockers controllably spreading apart after said rockers move out of said rails upon said pivot mount's rotating about the lower end, said rockers' spreading being retained by said retainer bracket on said actuator.

6. A portable pet waste collection and disposal device of claim 5, further comprising:
   a flexible clip on said prong base for releasably securing a disposable bag to said prong base.

7. A portable pet waste collection and disposal device of claim 6, further comprising:
   a bag, having an opening and a bottom, said opening having a folded rim around at least part of said opening, said folded rim having at least two entry points, said folded rim being adapted to receive said prong stems at said entry points;
   a ring spacer unit inserted at said entry point of said folded rim, said ring spacer having a central aperture, said ring spacer being adapted to prop said entry point open and unobstructed for receiving said prong stem through its aperture;
   a drawstring extending around said opening for controllably tightening said opening of said disposable bag;
   a flexible retainer on said folded rim for releasably retaining said disposable bag in a predetermined rolled-up shape, where said entry points remain in a juxtaposed parallel position, until deployment by said prongs.

8. A portable pet waste collection and disposal device, comprising:
   a nested wand having a handle, a lower end, an actuator coupled to said wand for controllably allowing said nested wand to extend, an external pivot mount hingedly coupled to said lower end of said wand, an external prong mount hingedly coupled to said pivot mount, and a pair of external prongs coupled to said prong mount, wherein:
   said pivot mount having a tendency to rotate about said lower end of said wand, defining a first axis of rotation, and deploying said prong mount concurrently, said pivot mount controllably rotating about said lower end of said wand, in reverse, upon pulling by said actuator;
   said prong mount having a normal tendency to spread said pair of prongs, defining a second axis of rotation substantially normal to said first axis, said prong mount controllably closing said pair of prongs upon pulling by said actuator; and,
   said actuator having a retainer bracket for retaining the spreading of said prongs.

9. A portable pet waste collection and disposal device of claim 8, wherein:
   said pivot mount and said prong mount rotate in substantially perpendicular relation to each other, and each of said pivot mount and said prong mount is biased by a torsion spring with a single rotation shaft.

10. A portable pet waste collection and disposal device of claim 9, further comprising a pull strap for flexibly connecting said actuator to said prong mount and pivot mount.

11. The portable pet waste collection and disposal device of claim 1, wherein:
   said first hinge comprises a prong mount having pair of rockers for holding the pair of prongs, said rockers being biased by a torsion spring;
   said second hinge comprises a pivot mount which is biased by a torsion spring, said pivot mount having a pair of opposing rails to guide movement of said rockers by restricting spreading of the rockers until the rockers clear out of the rails and, as said rockers clear out of said rails, said pair of prong stem spread apart as said rockers spread apart; and,
   said prong mount is adapted to be retracted by a user pulling of said actuator toward the upper end so that the rockers are forced into a closed position between the pair of opposing rails and the pair of prongs overlap over a portion of an exterior surface of the longitudinal length of said wand.

12. The portable pet waste collection and disposal device of claim 5, wherein:
   said pivot mount has a pair of opposing rails to guide movement of said rockers by restricting the spreading of the rockers until the rockers clear out of the rails;
   as said rockers clear out of said rails, said pair of prong stems spread apart as said rockers spread apart; and,
   said prong mount is adapted to be retracted by a user pulling of said actuator toward the upper end so that the rockers are forced into a closed position between the pair of opposing rails and the pair of prong stems overlap over a portion of an exterior surface of the longitudinal length of said wand.

* * * * *